(12) United States Patent
Takata et al.

(10) Patent No.: US 9,540,750 B2
(45) Date of Patent: Jan. 10, 2017

(54) WIRING HARNESS PROTECTION MATERIAL AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka, Osaka (JP)

(72) Inventors: Yutaka Takata, Yokkaichi (JP); Shigeyuki Tanaka, Yokkaichi (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

(*) Notice: Subject to any disclaimer, the term of this patent is extended or adjusted under 35 U.S.C. 154(b) by 0 days.

(21) Appl. No.: 14/380,224

(22) PCT Filed: Feb. 21, 2013

(86) PCT No.: PCT/JP2013/054298
§ 371 (c)(1),
(2) Date: Aug. 21, 2014

(87) PCT Pub. No.: WO2013/129222
PCT Pub. Date: Sep. 6, 2013

(65) Prior Publication Data
US 2015/0021089 A1 Jan. 22, 2015

(30) Foreign Application Priority Data
Feb. 27, 2012 (JP) ................................. 2012-039587

(51) Int. Cl.
*D04H 1/435* (2012.01)
*H02G 3/04* (2006.01)
*B60R 16/02* (2006.01)

(52) U.S. Cl.
CPC ............ *D04H 1/435* (2013.01); *B60R 16/0215* (2013.01); *H02G 3/0406* (2013.01); *H02G 3/0481* (2013.01); *D10B 2505/00* (2013.01); *Y10T 442/60* (2015.04); *Y10T 442/608* (2015.04)

(58) Field of Classification Search
USPC ....................... 174/72 A; 428/297.4; 264/143
See application file for complete search history.

(56) References Cited

U.S. PATENT DOCUMENTS 3,555,113 A * 1/1971 Sattler ........................... 525/429
3,639,424 A * 2/1972 Gray et al. ..................... 525/177
(Continued)

FOREIGN PATENT DOCUMENTS

JP 2010-267412 * 11/2010
JP 3166607 3/2011
JP WO 2011158394 * 12/2011

OTHER PUBLICATIONS

Nonwoven Fabrics Polyester Fibers Polyester Fibers Updated: Apr. 2004—Raghavendra R. Hegde, Atul Dahiya, M. G. Kamath (Ramaiah Kotra and Xiao Gao).*

*Primary Examiner* — Timothy Thompson
*Assistant Examiner* — Michael F McAllister
(74) *Attorney, Agent, or Firm* — Gerald E. Hespos; Michael J. Porco; Matthew T. Hespos

(57) ABSTRACT

It is aimed to provide a wiring harness protection material utilized as a wiring harness protection member and having protection performance in a high-temperature and high-humidity environment and a wiring harness. A wiring harness 1 is formed by molding wiring harness protection materials 1 using a thermally moldable nonwoven fabric
(Continued)

containing polyethylene terephthalate fibers having a weight-average molecular weight in a range of 10000 to 200000 into a wiring harness protection member 2 having a predetermined shape and covering a wire bundle 4 with the wiring harness protection member 2.

3 Claims, 1 Drawing Sheet

(56) References Cited

U.S. PATENT DOCUMENTS

| | | | | |
|---|---|---|---|---|
| 4,897,301 | A * | 1/1990 | Uno | H05K 1/0326 |
| | | | | 174/254 |
| 4,923,537 | A * | 5/1990 | Matsushima | 156/48 |
| 5,030,116 | A * | 7/1991 | Sakai | F02M 51/005 |
| | | | | 123/456 |
| 5,917,151 | A * | 6/1999 | O'Brien et al. | 174/72 A |
| 7,523,532 | B2 * | 4/2009 | Yamaguchi | B60R 16/0215 |
| | | | | 28/110 |
| 7,858,172 | B2 * | 12/2010 | Imaizumi | B29B 9/14 |
| | | | | 264/134 |
| 2006/0261509 | A1 * | 11/2006 | Lustiger et al. | 264/143 |
| 2009/0130443 | A1 * | 5/2009 | Lustiger | B29B 9/14 |
| | | | | 428/401 |
| 2011/0006454 | A1 | 1/2011 | Kawashiri | |
| 2011/0250814 | A1 * | 10/2011 | Bradley | D04H 1/005 |
| | | | | 442/341 |
| 2012/0055605 | A1 | 3/2012 | Murata et al. | |

\* cited by examiner

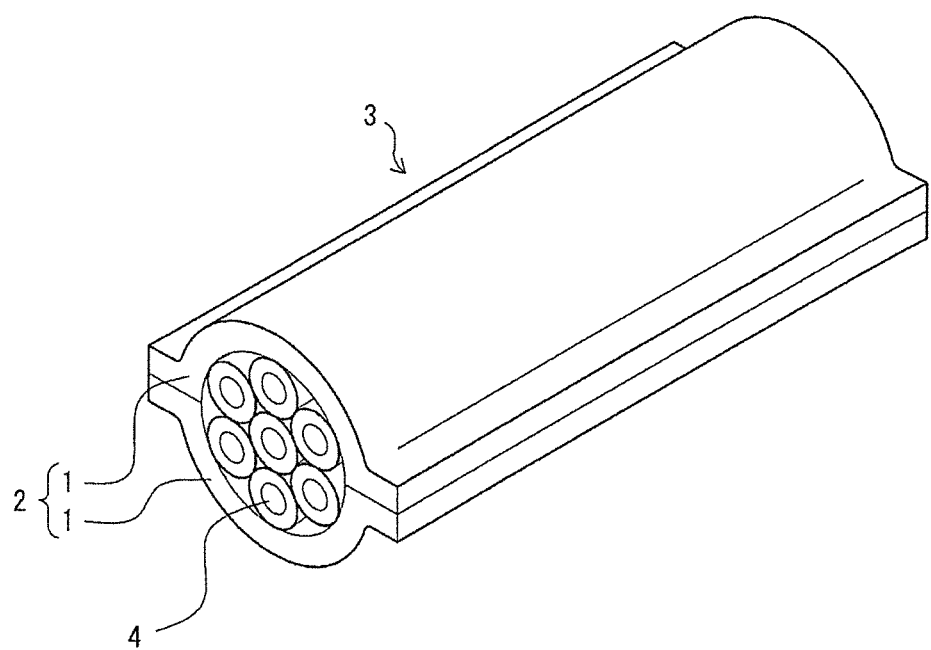

WIRING HARNESS PROTECTION MATERIAL AND WIRING HARNESS

BACKGROUND

1. Field of the Invention

The invention relates to a wiring harness protection material and a wiring harness.

2. Description of the Related Art

In recent years, there has been a progress in high performance and high functionality mainly for automotive vehicles and electric appliances. Plural wires are used for internal wiring of automotive vehicles, electric appliances and the like to accurately operate various electronics such as automotive vehicles and electric appliances. Generally, these wires are used in the form of a wiring harness.

In the wiring harness, a wire bundle composed of a plurality of wires is fabricated in a form necessary for wiring in advance. For example, the wiring harness is formed by forming necessary branching, connecting connectors and the like to ends of the wiring harness and winding a wiring harness protection member around the outer periphery of the wire bundle.

The above-described wiring harness protection member used is made of a sheet-like wiring harness protection material formed into one of various shapes such as a recessed groove and a tube, and formed into a predetermined shape by covering the wire bundle.

Generally, a nonwoven fabric made using polyethylene terephthalate short fibers (may be also called PET nonwoven fabric) is used for industrial and automotive applications. The PET nonwoven fabric is utilized in various fields such as filter and cushion materials, vehicle interior sheet materials and vehicle interior ceiling materials. The present applicant and others previously proposed protection materials for wiring harness using a nonwoven fabric formed using polyethylene terephthalate short fibers (see Japanese Unexamined Patent Publication No. 2010-267412).

A wiring harness protection member using the wiring harness protection material disclosed in Japanese Unexamined Patent Publication No. 2010-267412 is excellent in properties such as moldability and shape retention. The wiring harness protection member has a high possibility of being used in an on-vehicle environment having high temperature and high humidity when being used in an automotive wiring harness. However, the nonwoven fabric formed using polyethylene terephthalate short fibers has a problem of possibly reducing performance as a protection member since being degraded under high temperature and high humidity.

The present invention is designed to solve the problem of the prior art and aims to provide a wiring harness protection material utilized as a wiring harness protection member and having protection performance even in a high-temperature and high-humidity environment and a wiring harness.

SUMMARY OF THE INVENTION

The invention is directed to a wiring harness protection material using a thermally moldable nonwoven fabric, characterized in that the nonwoven fabric contains polyethylene terephthalate fibers having a weight-average molecular weight in a range of 10000 to 200000.

In the above-described wiring harness protection material, the polyethylene terephthalate fibers preferably have a fiber diameter of 1 to 40 denier and a fiber length of 30 to 120 mm.

In the above-described wiring harness protection material, the nonwoven fabric is preferably a short-fiber nonwoven fabric having a basis weight of 100 to 2000 g/m2 and a thickness of 0.5 to 30 mm.

The present invention also is directed to a wiring harness, characterized in that a wire bundle is covered with a wiring harness protection member formed of the above-described wiring harness protection material.

The wiring harness protection material of the invention uses a thermally moldable nonwoven fabric that contains the polyethylene terephthalate fibers having a weight-average molecular weight in the range of 10000 to 200000. Thus, even if the molecular weight of the polyethylene terephthalate fibers is reduced by being subjected to hydrolysis in a high-temperature and high-humidity environment, the molecular weight can be maintained in a certain level. Therefore, protection performance can be satisfied as compared with a protection material fabricated using a nonwoven fabric made of polyethylene terephthalate fibers having a weight-average molecular weight below 10000.

Further, the wiring harness of the invention can exhibit protection performance even in an on-vehicle environment such as high temperature and high humidity by covering the wire bundle with the wiring harness protection member made of the above wiring harness protection material.

BRIEF DESCRIPTION OF THE DRAWING

FIG. 1 is an external perspective view showing an example of a wiring harness of the present invention.

DETAILED DESCRIPTION

FIG. 1 is an external perspective view showing an example of a wiring harness of the present invention. As shown in FIG. 1, a wiring harness 3 is formed by covering a wire bundle 4 with a wiring harness protection member 2 formed of wiring harness protection materials 1 made of a thermally moldable nonwoven fabric.

The wiring harness protection material 1 (hereinafter, may be also merely referred to as a protection material) is formed into a sheet using the nonwoven fabric containing polyethylene terephthalate short fibers (hereinafter, may be also referred to as PET short fibers). The wiring harness protection member 2 is formed by thermally molding the wiring harness protection materials 1 into a predetermined shape and has a function to retain the shape of the wiring harness 3 and a function as a protection member for the wire bundle 4.

The nonwoven fabric containing the PET short fibers of the protection material 1 is thermally moldable. In the present invention, the thermal moldability of the nonwoven fabric means that the nonwoven fabric can be molded into a predetermined shape by being heated.

The PET short fibers are made of polyethylene terephthalate (hereinafter, may be also referred to as PET) having a weight-average molecular weight in a range of 10000 to 200000. In the present invention, the weight-average molecular weight of PET is a weight-average molecular weight (Mw) in terms of methacrylic acid resin (PMMA) measured using a GPC (Gel Permeation Chromatography) device.

The weight-average molecular weight of the PET short fibers can be measured, for example, using a commercially available GPC device produced by Tosoh Corporation under the product name "HLC-8120" or the like. A GPC measurement of the weight-average molecular weight can be conducted at a flow velocity of 0.3 ml/min using a column produced by Tosoh Corporation under the product name of "TSK-gel super AWM-H (6 mml.D.×15 cm)" and 1,1,1,3,3,3-hexafluoropropanol (HFIP) as an eluent.

If the weight-average molecular weight of the PET short fibers is below 10000, a performance reduction is notable since the molecular weight is excessively reduced such as due to hydrolysis after exposure to a high-temperature and high-humidity environment. As a result, protection performance as the wiring harness protection material may become insufficient. If the weight-average molecular weight of the PET short fibers is not below 10000, the molecular weight is not excessively reduced and there is no possibility of performance reduction since the molecular weight is maintained in a certain level even if being reduced such as due to hydrolysis after exposure to a high-temperature and high-humidity environment.

If the weight-average molecular weight of the PET short fibers is above 200000, the molecular weight is excessively increased and thermal moldability and the like may be reduced. Further, the fibers become hard to reduce stretchability, which may cause troubles such as the one that thermal molding becomes impossible.

PET short fibers having a basis weight of 100 to 2000 g/m2 and a thickness of 0.5 to 30 mm are used. The PET short fibers have a fiber diameter of 1 to 40 denier and a fiber length of 30 to 120 mm. Examples of fiber shapes of the PET short fibers may include a cylindrical shape, a hollow shape, a side-by-side shape and a core-sheath shape. Further, modified cross-section fibers having different fiber shapes may be used as the PET short fibers.

The protection material 1 is obtained by fabricating a nonwoven fabric by needle punching or spunbonding using fibers containing the above PET short fibers having a molecular weight of 10000 to 200000.

The nonwoven fabric of the protection material 1 contains the PET short fibers having a molecular weight of at least 10000 to 200000, but may contain thermoplastic resin fibers other than PET short fibers having a molecular weight of 10000 to 200000 as long as it does not reduce heat resistance and humidity resistance performance.

Examples of thermoplastic resin used in such thermoplastic resin fibers may include modified polyethylene terephthalate, polyester resin such as polylactic acid, polyethylene resin, polypropylene resin, polyamide resin such as 6-nylon and 6,6-nylon, acrylic resin, triacetate resin, polytetrafluoroethylene resin, polyvinyl alcohol resin and polyvinyl chloride.

Further, binder fibers coated with a binder layer may be used as the PET short fibers used in the nonwoven fabric of the protection material. Examples of the above binder layer may include copolymer of polyethylene isophthalate and PET.

As shown in FIG. 1, the wiring harness 3 is formed by covering the wire bundle 4 as a bundle of a plurality of wires with the wiring harness protection member 2. The wiring harness protection member 2 is formed using the protection materials 1 made of the nonwoven fabric containing the PET short fibers having a weight-average molecular weight in the above specific range.

To manufacture the wiring harness 3, sheets of the protection materials 1 are arranged to face each other in a predetermined forming mold composed of separate upper and lower molds and molding is performed in a state where the mold is clamped and the wire bundle 4 is sandwiched between the two protection materials 1, 1. During molding, the upper and lower protection materials 1, 1 projecting outwardly of the wire bundle 4 are bonded to each other. Further, upon thermal molding, the outer surface of the wire bundle 4 and the protection materials 1 are thermally fused to be joined.

The wiring harness of the present invention is not limited to the above form. Although not particularly shown, the wiring harness may be formed by performing thermal molding with one sheet of the protection material 1 wound around the wire bundle 4 and forming the wiring harness protection member 2 into a predetermined shape.

In the above case, the wiring harness protection member may be so formed that a cross-section intersecting with a longitudinal direction is a circular shape or a rectangular shape.

The wiring harness 3 of the present invention can be suitably used as a wiring harness for automotive vehicle or the like.

EXAMPLES

Examples and comparative examples of the present invention are described below. The invention is not limited to these examples.

Examples 1 to 5, Comparative Example 1

A molecular weight after being left under a high-temperature and high-humidity condition was measured and physical properties were evaluated by conducting a tensile test and an abrasion resistance test for each of PET nonwoven fabrics using polyethylene terephthalate short fibers (PET short fibers) having different molecular weights shown in TABLE-1. Results of the tests are shown in TABLE-1. Note that the nonwoven fabrics used in the tests had a basis weight of 300 g/m2, a thickness of 3.0 mm, a fiber diameter of the PET short fibers of 4.4 denier and a fiber length of 51 mm.

Evaluation methods are as follows.

The high-temperature and high-humidity condition was set at a temperature of 80° C. and a humidity of 100% in accordance with JIS C60068-38-4 using a high-temperature and high-humidity tester and left for 500 hours.

A tensile test method conformed to a tensile test method of JIS K6251 and the tensile test was conducted for each sample before (initial) and after the high-temperature and high-humidity test. The result of the tensile test was evaluated to be good (○) when rupture strength of the sample after the high-temperature and high-humidity test was higher than 50% of the rupture strength of the initial sample and to be not good (×) when this rupture strength was not higher than 50%.

An abrasion resistance test method conformed to an abrasion resistance test method of JIS K7218 and the abrasion resistance test was conducted for each sample before (initial) and after the high-temperature and high-humidity test. The result of the abrasion resistance test was evaluated to be good (○) when an abrasion amount of the sample after the high-temperature and high-humidity test was equal to or smaller than that of the initial sample and to be not good (×) when this abrasion amount was larger than the initial abrasion amount.

The sample was determined to be satisfactory (○) when the results of the tensile test and the abrasion resistance test were both good. The sample was determined to be unsatisfactory (×) when either one of the results was not good.

TABLE 1

|  | Examples | | | | | C. Example |
|---|---|---|---|---|---|---|
|  | 1 | 2 | 3 | 4 | 5 | 1 |
| Initial physical properties | | | | | | |
| Molecular weight (Mw) of PET nonwoven fabric | 10000 | 30000 | 50000 | 100000 | 200000 | 8000 |
| After high-temperature and high-humidity evaluation | | | | | | |
| Molecular weight (Mw) of PET nonwoven fabric | 6000 | 17000 | 30000 | 65000 | 150000 | 2000 |
| Tensile test result (○, x) | ○ | ○ | ○ | ○ | ○ | x |
| Abrasion resistance test result (○, x) | ○ | ○ | ○ | ○ | ○ | x |
| Determination (○, x) | ○ | ○ | ○ | ○ | ○ | x |

As shown in TABLE-1, any of Examples 1 to 5 using the PET short fibers in a molecular weight range of 10000 to 200000 was good in the results of both the tensile test and the abrasion resistance test. Contrary to this, Comparative Example 1 using the PET short fibers having a molecular weight of below 10000 was not good in the results of both the tensile test and the abrasion resistance test and determined to be unsatisfactory.

Although the examples of the present invention have been described in detail above, the present invention is not limited to the above examples at all and various changes can be made without departing from the gist of the present invention.

The invention claimed is:

1. A wiring harness, comprising:
a wire bundle including a plurality of wires extending in a longitudinal direction; and
a wiring harness protection member having first and second protection material sheets, each of the first and second protection material sheets being a nonwoven fabric made of polyethylene terephthalate fibers having a weight-average molecular weight in a range of 10000 to 200000 and a fiber length of 51 to 120 mm, each of the first and second protection material sheets further having first and second side edges extending in the longitudinal direction, the nonwoven fabric of the first and second protection material sheets being thermally molded to the wire bundle so that an outer surface of the wire bundle is thermally fused to a portion of the wiring harness protection member and the first and second side edges of the first protection material sheet are bonded to the first and second side edges of the second protection material sheet, respectively.

2. The wiring harness of claim 1, wherein the polyethylene terephthalate fibers have a fiber diameter of 1 to 40 denier.

3. The wiring harness of claim 1, wherein the nonwoven fabric is a short-fiber nonwoven fabric having a basis weight of 100 to 2000 g/m$^2$ and a thickness of 0.5 to 30 mm.

* * * * *